United States Patent
Belenkiy et al.

(10) Patent No.: US 9,239,437 B2
(45) Date of Patent: Jan. 19, 2016

(54) FIBER OPTIC CONNECTOR REMOVAL CLIPS

(71) Applicant: Molex, LLC, Lisle, IL (US)

(72) Inventors: Yuriy Belenkiy, Wheeling, IL (US); Thomas R. Marrapode, Naperville, IL (US)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 14/507,457

(22) Filed: Oct. 6, 2014

(65) Prior Publication Data
US 2015/0023646 A1    Jan. 22, 2015

Related U.S. Application Data

(63) Continuation of application No. 12/074,777, filed on Mar. 6, 2008, now Pat. No. 8,855,458.

(51) Int. Cl.
*G02B 6/00*      (2006.01)
*G02B 6/38*      (2006.01)

(52) U.S. Cl.
CPC ............ *G02B 6/3898* (2013.01); *G02B 6/3897* (2013.01)

(58) Field of Classification Search
None
See application file for complete search history.

(56) References Cited

U.S. PATENT DOCUMENTS

| | | | |
|---|---|---|---|
| 5,516,305 A * | 5/1996 | Haluska | 439/484 |
| 5,564,939 A | 10/1996 | Maitani et al. | |
| 6,447,170 B1 | 9/2002 | Takahashi et al. | |
| 6,733,323 B2 | 5/2004 | Tso-Chin | |
| 6,845,207 B2 | 1/2005 | Schray | |
| 7,020,376 B1 | 3/2006 | Dang et al. | |
| 7,035,519 B2 | 4/2006 | Segroves et al. | |
| 7,194,178 B2 | 3/2007 | Nakano | |
| 7,224,879 B2 | 5/2007 | Reinert et al. | |
| 7,297,013 B2 | 11/2007 | Caveney et al. | |
| 7,534,128 B2 | 5/2009 | Caveney et al. | |
| 2002/0146931 A1* | 10/2002 | Richmond et al. | 439/488 |
| 2003/0044122 A1 | 3/2003 | Lee | |
| 2005/0259930 A1 | 11/2005 | Elkins et al. | |
| 2006/0089039 A1* | 4/2006 | Caveney et al. | 439/352 |

FOREIGN PATENT DOCUMENTS

JP      2003-018466      8/2004

* cited by examiner

*Primary Examiner* — Ryan Lepisto
*Assistant Examiner* — Erin Chiem
(74) *Attorney, Agent, or Firm* — Jeffrey K. Jacobs (57) ABSTRACT

A removal clip is provided for disconnecting a fiber optic connector from an array of installed fiber optic connectors. The removal clip includes an engagement portion for engaging the connector and a force transmitting structure that allows digital removal force from a user to be applied at a distance from the connector. The engagement portion may be generally U-shaped and includes opposing latch arms configured to accommodate the body of a fiber optic connector. The latch arms permit the engagement portion to snap attach to the connector. The force transmitting structure may include a beam and a handle extending axially or radially from the gripping section. Also included is an assembly of a removal clip attached to a fiber optic connector.

14 Claims, 6 Drawing Sheets

FIBER OPTIC CONNECTOR REMOVAL CLIPS

REFERENCE TO RELATED APPLICATIONS

The Present Disclosure claims priority to U.S. Pat. No. 8,855,458, entitled "Fiber Optic Connector Removal Clips," issued on 7 Oct. 2014. The '458 patent is based on U.S. patent application Ser. No. 12/074,777, which was filed on 6 Mar. 2008. The content of the above-referenced patent is fully incorporated in its entirety herein.

BACKGROUND OF THE PRESENT APPLICATION

This Present Disclosure generally pertains to tools or removal devices for disconnecting fiber optic connectors. The removal device accommodates closely mounted fiber optic connectors in that a connector can be removed through the digital action of a user's hand without disrupting or dislodging surrounding connectors.

It is generally known that, from time to time, fiber optic connectors including standard connectors such as MPO connectors may be removed or unmated from another connector or from an adapter. For example, fiber optic connectors may need to be removed from an adapter or another connector for repair, replacement or to be used in a different configuration. These connectors are often mounted in tight configurations with little space between them to obtain high connector density. While removing fiber optic connectors with digital ease is an important consideration, it is undesirable to accomplish this to the detriment of good space management and connector density.

Goals that have been arrived at in accordance with the approach of the Present Disclosure, while maintaining connector density, include the attachment of a removal device to connectors that are unmodified for this purpose, eliminating the use of tools that can be easily lost and providing strong structures with flexible designs that transfer digital force from uncongested positions surrounding the fiber optic connector. The Present Disclosure also recognizes that removal devices should be easy to attach from the fiber optic connectors.

Prior art approaches that either have not recognized the positives that could be gained by seeking to achieve these types of objectives or teach solutions other than those of the present approach include U.S. Pat. No. 5,031,981. This patent describes an attachment and disengagement tool for bayonet type fiber optic connectors. The bayonet connector of this patent comprises a coupling nut with raised knurls and J-shaped bayonet slots. The attachment and disengagement tool has L-shaped recesses to fit around and abut the pattern of raised knurls of the coupling nut of the bayonet connector permitting the tool to attach and disengage the bayonet connector. U.S. Pat. No. 5,146,813 describes a tool for removing and installing fiber optic connectors. The tool has an open-ended socket that receives a fiber optic connector. A rotatable grab element is mounted on the socket. As the grab element is rotated, an end of the grab element rotates inward towards the fiber optic connector, engaging the connector in a gripping manner. U.S. Pat. No. 5,956,832 describes and requires two parallel arms having tips for engaging corresponding features of a latch mechanism in an SC-type fiber optic connector. Also required is a wedge structure slidably attached to a tapered surface for controlling the force that the two parallel arms apply to the SC-type fiber optic connector. U.S. Pat. No. 6,981,803 describes a fiber optic connector module having a rear-extending member to facilitate assembly and removal of the module from a connector housing, an adapter or similar structure. The rear extender attaches to a structure by means of at least one attachment arm that moves into the structure by means of guide rails.

U.S. Pat. No. 7,008,117 describes a multi-component adapter for an optical connector assembly used to align the connector housings. This patent teaches an adapter with features such as the adapter having a shell and a latch ring or a locking member whereby pressure on the tab causes disengagement of the locking member. This adapter also may be used with identifying chips to align the optical connector assembly. U.S. Pat. No. 7,020,376 describes a tool device that comprises a prying end coupled to a grasping end wherein the coupling members, such as a pair of arms, are disposed to transmit a grasping force to the grasping end. The prying end further comprises a prying protrusion and a vertex coupled thereto that intercouple each pair of arms. The tool can be used on a variety of optical connectors of the types including MPO, MT-RJ, LC, SC and SFP. This patent describes tools for removing connectors from high-density fiber optic applications and describes a pair of gripping jaws that move in response to the movement of a trigger in the handle.

Another prior art proposed tool is a rigid metal wire with a metal tab. Free ends or posts of the metal wire are temporarily placed into opposing holes lying along a common axis of the latch housing of the fiber optic connector. In use, the user lifts up on the metal tab, which then rotates on the axis of the two metal posts. The metal parts of this unit push up against the mating adapter and pry back the latch housing to disengage the fiber optic connector from the adapter to remove the connector.

It has been determined that various characteristics of prior art, such as these patents, have shortcomings and undesirable attributes, results or effects. The present approach has recognized and addresses matters such as these to provide enhancements not heretofore available. Overall, the present approach provides a more fully enhanced result for optical connector removal devices.

SUMMARY OF THE PRESENT APPLICATION

An aspect, object or embodiment of the Present Disclosure generally pertains to fiber optic connector tools or removal clips having an engagement portion that may be easily attached to a fiber optic connector such as by snap-on action and thus remain with the connector or may be easily removed from the connector with snap-off action. The removal clips do not require changes to the fiber optic connectors nor do they require changes or modifications to mounting adapters or to tight mounting configurations.

According to another aspect, object or embodiment, the removal clips of the Present Disclosure include an engagement portion that is generally U-shaped and features resilient latch arms, the engagement portion being configured to accommodate the contour of the body of a connector by snapping action. The engagement portion is thin, flexible and resilient, and the removal clips are sufficiently thin-walled and shape-conforming to fit within restrictive spacing between connectors when tight mounting configurations are employed, while exhibiting strength characteristics adequate to repeatedly transmit and withstand forces that develop upon removal of the connectors by the removal clips.

In accordance with another aspect, object or embodiment, the Present Disclosure includes structures that permit digital removal force to be applied at a position that is distant from the gripping portion and at a less congested location. The structure may include a distant handle to which digital force is applied. The handle transmits the force to the connectors through additional structure that may be a beam between the distally positioned engagement portion and a proximally positioned gripping handle.

According to still another aspect, object or embodiment, the Present Disclosure provides can be embodied with different handle configurations to vary the distance and direction from the connector at which the digital force may be applied. For instance, the gripping handle may extend axially or radially from the connector and may extend from different points on the connector.

According to further aspects, objects or embodiments, the removal clip is economical and easy to produce and easy to use. The removal clip may be a single unitary piece that may be manufactured by molding such as from thin polymeric material.

In accordance with a further aspect, object or embodiment, the Present Disclosure may include an assembly of standard fiber optic connectors such as MPO connectors with removal clips as described above attached thereto.

BRIEF DESCRIPTION OF THE FIGURES

The organization and manner of the structure and operation of the Present application, together with further objects and advantages thereof, may best be understood by reference to the following Detailed Description, taken in connection with the accompanying Figures, wherein like reference numerals identify like elements, and in which.

DESCRIPTION OF THE PREFERRED EMBODIMENTS

While the Present application may be susceptible to embodiment in different forms, there is shown in the Figures, and will be described herein in detail, specific embodiments, with the understanding that the disclosure is to be considered an exemplification of the principles of the Present application, and is not intended to limit the Present application to that as illustrated.

In the illustrated embodiments, directional representations—i.e., up, down, left, right, front, rear and the like, used for explaining the structure and movement of the various elements of the Present application, are relative. These representations are appropriate when the elements are in the position shown in the Figures. If the description of the position of the elements changes, however, it is assumed that these representations are to be changed accordingly.

Tightly spaced fiber optic connectors are important from a space management and data transmission perspective; however, the restrictive spacing of a dense fiber optic array impedes the ability to use normal digital force to remove or unmate connectors from a mating array. Removal tools may be used to aid in removing connectors when needed, but employing removal tools for this purpose can be unsatisfactory if the removal tools are bulky and/or may not work properly in the available tight space or may damage the fiber optic connector during the removal action. In the embodiments that follow, the removal device includes a gripping section that can attach to a connector and a remote handle such that applying digital force to the handle can remove the connector.

The removal tools of the present disclosure do not require any modification of the connectors in order to provide engagement that allows for removal of the connector when desired or for maintaining the removal tools in place when desired, such as for color coding functions discussed herein. The removal tools are easily attached to the connectors and can remain so attached for short or long durations, depending on the needs to be addressed. Also, the removal tools are easily attached to the connectors. The removal tools are thin, durable and easy to construct. The removal tools do not take up too much space around the fiber optic connector and thus can be used in dense or tight spacing between adjacent mounted connectors, typical spacing between adjacent fiber optic connectors in the same array being approximately 9 mm and the typical spacing between adjacent fiber optic connectors in adjacent arrays being approximately 25 mm. Although not requiring much space, the removal tools still exhibit sufficient strength to transmit removal force and they will withstand multiple removals. These removal tools are able to transmit force from a less congested distant position to the body of the connectors, and they provide flexibility in the position along which the digital force is transmitted. These removal tools also are easy and economical to produce, and they are not too complex in design.

Figure 1:
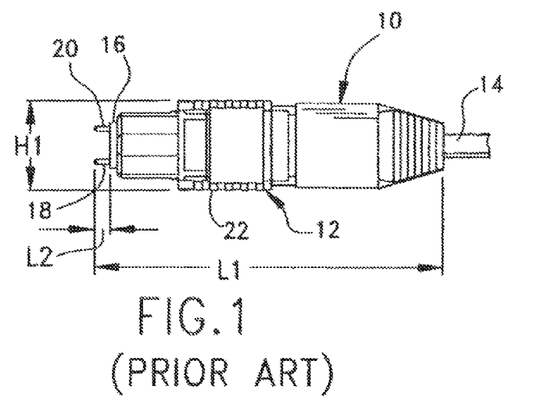
FIG. 1 is a side elevation view, partially broken away, of a prior art MPO connector illustrating a connector body section.
Figure 1A:
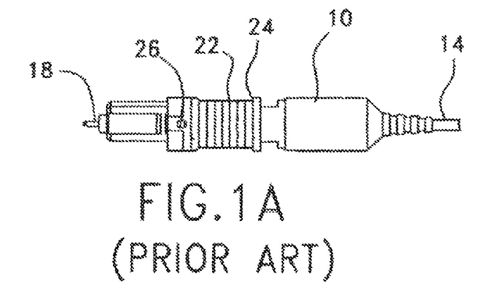
FIG. 1A is another side elevation view, partially broken away, of the MPO connector of FIG. 1, showing the connector body section in more detail.
Figure 1B:
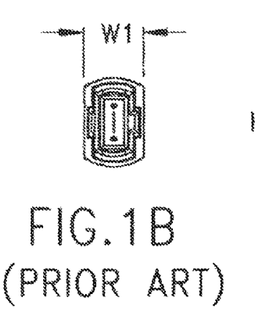
FIG. 1B is a top plan view of the prior art MPO connector of FIG. 1.

FIGS. 1, 1A and 1B illustrate an embodiment of a prior art standard MPO fiber optic connector generally shown as 10. Fiber optic connector 10 has body section 22 and is a male push-pull connector with keyed housing generally shown as 12 that suitably interconnects multiple fibers of ribbon or ruggedized ribbon cable 14. A ferrule 16 is included. Connector 10 has length (L1), height (H1) and width (W1). As a typical example, L1 is about 47.3 mm, H1 is about 12.4 mm and W1 is about 7.8 mm. Alignment between ferrule 16 and a mating ferrule in a connector adapter for this embodiment is accomplished using precision guide pins 18 and 20 as is known in the art. Two holes in the mating female connector correspond to guide pins 18 and 20 and provide core-to-core alignment of the optical fibers. A protruding member provides a shoulder 24 along at least a portion of the transverse periphery of the fiber optic connector 10. Generally opposing holes 26 are provided in this embodiment and provide attachment points for a prior art tool having generally opposing metal posts that enter such holes 26, typically along a common axis. Connector 10 has a removal or unmating force, typically between about 16 N (3.6 pounds) and about 17.8 N (4 pounds).

Figure 2:
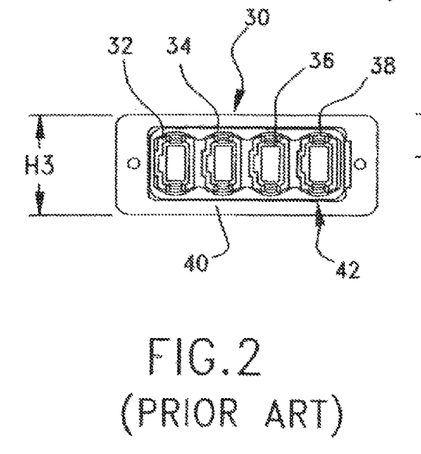
FIG. 2 is a is a top plan view of prior art MPO connector adapters and further depicting an adapter panel.
Figure 2A:
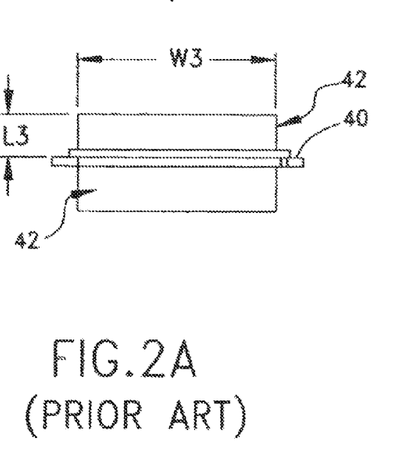
FIG. 2A is a side elevation view of a prior art MPO adapter panel mounted to a circuit board.

FIGS. 2 and 2A show an embodiment of an adapter unit, generally shown as 30, with four standard adapters 32, 34, 36 and 38 wherein each adapter can receive optical fiber connectors such as connector 10 described above. The adapter unit 30 is mounted on a panel 40 and has a flange 44 and an MPO adapter section, generally shown as 42, that has length (L3), height (H3) and width (W3). As a typical example, L3 is about 7.9 mm, H3 is about 20 mm, and W3 is about 40 mm. The small dimensions of connector 10 and adapter section 40 are advantageous with regard to optical fiber connection density, but cause difficulty when removing connector 10 with digital force unless one pulls on the optical fiber rather than the connector itself.

Figures 3, 3B:
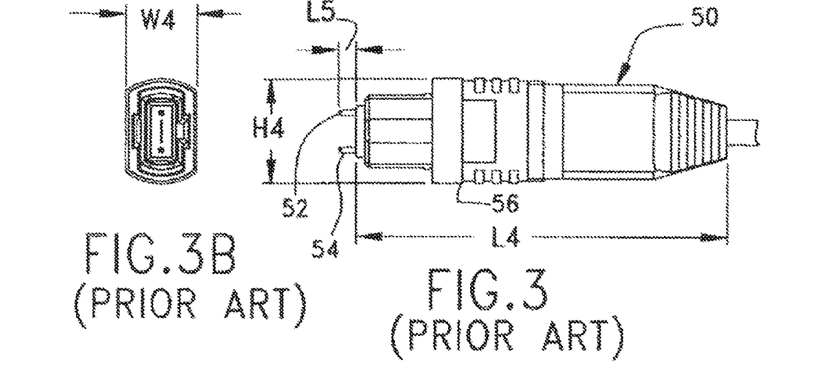
FIG. 3 is a side elevation view, partially broken away, of another prior art MPO connector illustrating a connector body section.
FIG. 3B is a top plan view of the MPO connector of FIG. 3.
Figure 3A:
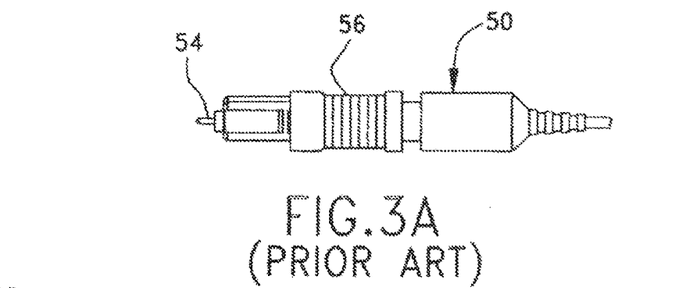
FIG. 3A is another side elevation view, partially broken away, of the MPO connector of FIG. 3, showing this connector body section in more detail.

FIGS. 3, 3A and 3B present an embodiment of another typical prior art standard MPO fiber optic connector generally shown as 50 that has body section 56. MPO connector 50 has length (L4), height (H4) and width (W4) generally in accordance with like dimensions of connector 10 and has a removal force generally in accordance with that of connector 10. This particular connector 50 is devoid of the holes 26 found in connector 10, thus generally precluding the use, as a removal tool for this connector 50, of the aforementioned prior art tool having generally opposing metal posts for entering connector holes of a connector.

Figures 4, 4A, 4B, 4C:
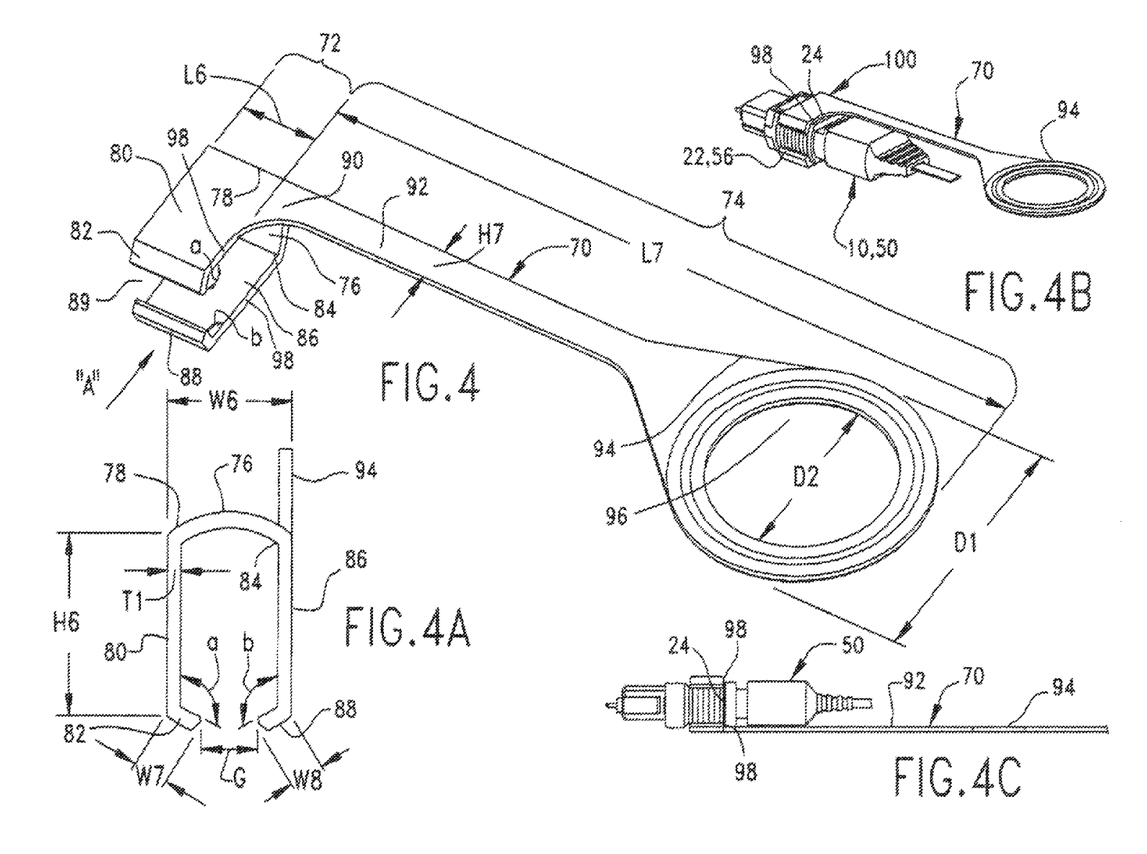
FIG. 4 is a perspective view of a removal clip with a circular handle having an aperture extending axially from the engagement portion.
FIG. 4A is a top plan view of the removal clip of FIG. 4.
FIG. 4B is a perspective view, partially broken away.
FIG. 4C is an elevation view of an assembly of a removal clip of FIG. 4 and an MPO connector, with FIGS. 4B-4C showing the assembly as fully engaged.

FIGS. 4 and 4A illustrate an embodiment of this Present Disclosure. Connector removal tool or clip generally shown as 70 has an engagement portion generally shown as 72 and force transmitting portion generally shown as 74. Connector removal clip 70 is suitably made of molded polymeric material such as glass filled polyether imide and has a thickness (T1) typically of about 1 mm. Engagement portion 72 is configured to accommodate and tightly engage or hold body section 22 of connector 10 (FIG. 1) or body section 56 of connector 50 (FIG. 3). Engagement portion 72 is generally U-shaped and features resilient latch arms 80 and 86 joined together by a web 76. These latch arms can be considered as free arms that are deflectable. This combination of latch arms 80 and 86 and web 76 combine to provide a resilient structure that opens to permit passage of a fiber optic connector thereinto, after which the generally U-shape closes onto the connector. The web can be suitably curved or convex with a width (W6) of about 8.8 mm and length (L6) of about 7 mm. Latch arm 80 extends at about a right angle from one end portion 78 of web 76, the latch arm 80 having a height (H6) of about 12 mm. Extending from the latch arm 80 at an angle "a" of between about 100 degrees and about 130 degrees, typically between about 110 degrees and about 120 degrees, for example about 115 degrees, is first angled end portion 82 with width (W7) of about 2.6 mm.

Latch arm 86 extends at about a right angle from an opposing end portion 84 of web 76. Latch arm 80 and latch arm 86 are generally parallel and extend in the same direction from the web 76. Extending from the latch arm 86 is second angled end portion 88 at an angle "b" of between about 100 degrees and about 130 degrees, typically between about 110 degrees and about 120 degrees, usually about 115 degrees. Second end panel 88 has a width (W8) of about 2.6 mm.

Engagement portion 72 is configured with sufficient gripping strength to maintain its position on body section 22 of connector 10 or body section 56 of connector 50 during removal of such connector. Engagement portion 72 also has sufficient flexibility for snap-on attachment and snap-off removal from connector 10 or connector 50. More particularly, the angled end portions 82 and 88 are positioned in a generally opposed, converging relationship to define an access gap 89 therebetween. This engagement portion 72 accommodates passage through access gap 89 by an unmodified or conventional fiber optic connector 10 (such as in the direction shown by arrow "A" in FIG. 4) by deflection of first and second latch arms 80, 86 to permit passage of the connector therebetween, followed by resilient snapping movement of latch arms 80, 86 back toward the undeflected position as shown in FIG. 4A to thus grasp the connector. The usual spacing ("G") between the remote end edges of the angled end portions 82 and 88 in the embodiment shown is typically about 4 mm.

Force transmitting portion 74 has length (L7) of about 70 mm and includes a transition portion 90 extending from one of the latch arms of engagement portion 72, which is positioned at the distal end portion of the removal tool or clip. In the illustrated embodiment, transition portion 90 extends in a direction considered axial into a force transmitting beam 92 that has a height (H7) of about 3.5 mm. At its distal end, the transmitting beam 92 is positioned as close to the bight portion as possible to maximize engagement between the edge 98 and the shoulder 24 of the connector. At its proximal end, the transmitting beam 92 extends into a handle portion at a proximal end of the tool circular handle 94 that has an aperture 96. Together the handle portion and the force transmitting portion are greater in length than the body portion of the connector. Circular handle 94 has an outside diameter (D1) typically of about 23 mm and an inside diameter (D2) typically of about 16 mm and thus sized to receive an operator's finger therein. It will be noted that, with this embodiment, the handle is generally parallel to the latch arms to avoid possible spatial interference between adjacent removal tools when a plurality of same are attached to a plurality of respective adjacent fiber optic connectors.

FIG. 4B illustrates an embodiment of a clip-connector assembly generally shown as 100. Assembly 100 is comprised of clip 70 releasably attached to connector 10 or connector 50. Digital removal force can more easily be applied at handle portion 94 rather than at the connector because it is separated from the congestion surrounding the body section of the mounted connector when the connectors are mounted in a closely spaced array. In keeping with the Present Disclosure, a rearwardly or outwardly facing edge 98 of one latch arm (or more typically both latch arms) of the engagement portion 72 engages the shoulder 24. In other words, edge 98 faces in the direction of unmating of the connector 10 and shoulder 24 faces in the direction of mating of the connector. With this engagement, when it is desired to remove or unmate the connector, the operator pulls on the proximal handle portion, and the resulting pulling force is transmitted to the connector through the interface between the engagement portion latch arm and the shoulder of the connector. FIG. 4C shows clip 70 in engagement with the connector. More specifically, FIG. 4C shows the outwardly facing edges 98 of the clip in engagement with the inwardly facing shoulder 24 of the connector.

Figure 5:
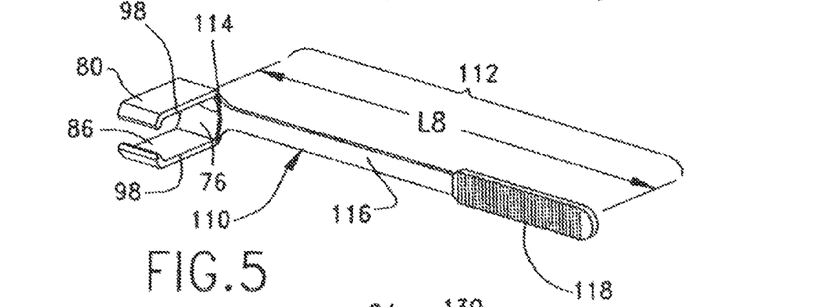
FIG. 5 is a perspective view of another embodiment of a removal clip having an elongated handle extending axially from the engagement portion.

FIG. 5 illustrates a second embodiment of a fiber optic connector removal clip or tool, generally shown as 110, that has a force transmitting portion generally shown as 112 with a length (L8) typically of about 70 mm. Force transmitting portion 112 includes a transition portion 114 that extends from the web 76 of engagement portion 72 in a direction considered axial and extends into force transmitting beam 116. Force transmitting portion 112 also includes at its proximal portion a linear handle 118 that extends from the force transmitting beam 116. It will be noted that, with this embodiment, the handle is generally perpendicular to the latch arms extending from the web 76, the handle 118 being centered with respect to the bight portion of the distally positioned engagement portion 72. This provides a relatively centered engagement between the rearwardly facing edge 98 of the engagement portion latch arm and the shoulder 24 of the connector.

Figure 5A:
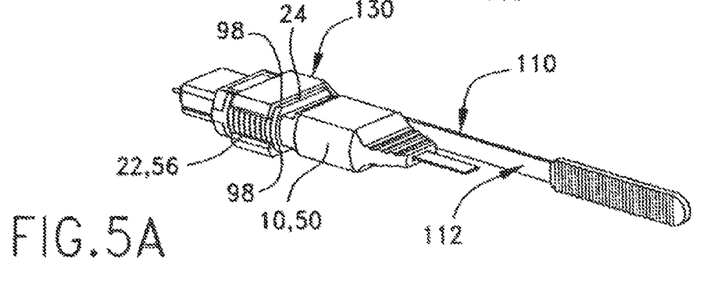
FIG. 5A is a perspective view, partially broken away, of an assembly of the removal clip of FIG. 5 and an MPO connector.

FIG. 5A illustrates an embodiment of a clip-connector assembly generally shown as 130 that comprises clip 110 releasably attached to connector 10. Digital removal force exerted on relatively uncongested linear handle 118 is transmitted to mounted connector 10 to effect removal or unmating thereof by transmitting the pulling force applied by the operator at the handle to the connector through the interface between the engagement portion latch arm and the connector shoulder 24.

Figures 6, 6A:
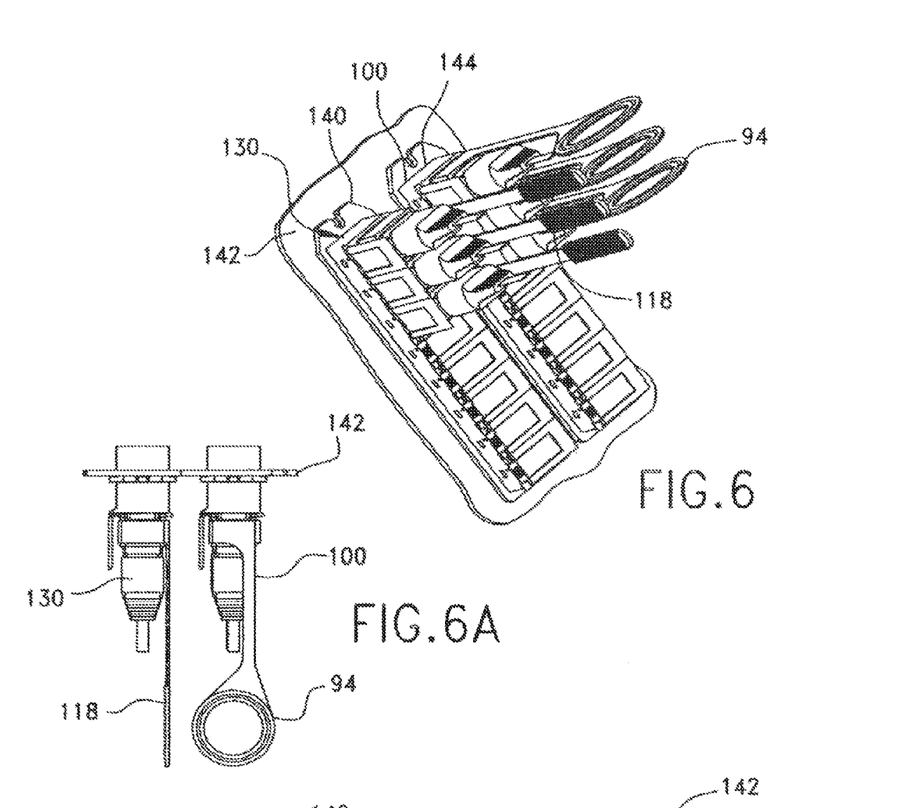
FIG. 6 is a perspective view, partially broken away, of an assembly of removal clips with extending handles, MPO connectors, MPO adapters and a panel.
FIG. 6A is an end elevation view of an assembly of removal clips generally as in FIG. 6.
Figures 6B, 6C:
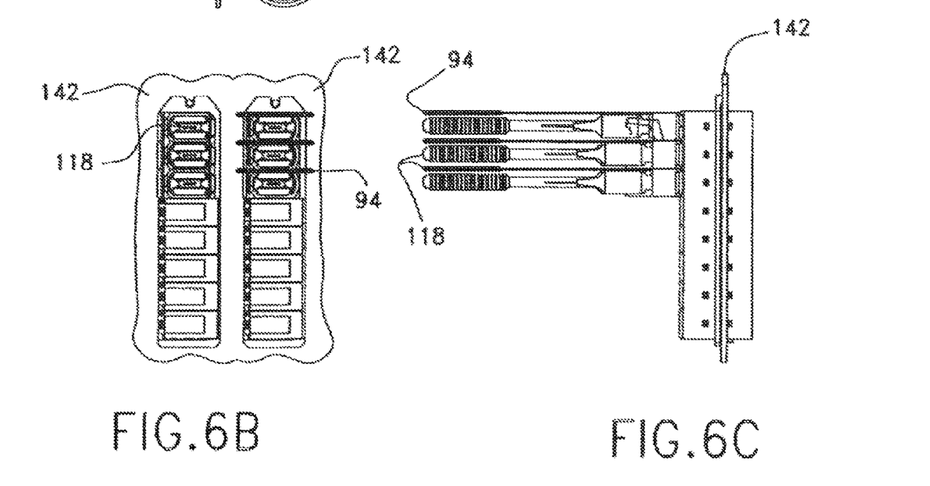
FIG. 6B is a top plan view, partially broken away, of removal clips and MPO connectors, MPO adapters and a panel, generally as in FIG. 6.
FIG. 6C is a side elevation view of an assembly of removal clips and MPO connectors, MPO adapters and a panel showing more detail, generally as in FIG. 6.

FIG. 6 shows an embodiment of first clip-connector assemblies 100 positioned in adapters contained in flange 140 that is attached to panel 142. Further illustrated are second clip-connector assemblies 130 positioned in adapters contained in flange 144 that is also attached to panel 142. It is readily seen that the spaces surrounding circular handles 94 and linear handles 118 of first clip-connector assemblies 100 and second clip-connector assemblies 130 are less crowded than the spaces surrounding the body sections of the connectors in the first and second assemblies. Less congestion around circular handles 94 and around linear handles 118 facilitates the application of digital removal force to these handles. FIGS. 6A, 6B and 6C further illustrate the open space surrounding circular handles 94 and linear handles 118. It should be understood that any combination of connector removal clips 70, 110 may be used such that all of the removal clips could be of the first embodiment 70, of the second embodiment 110, or any combination thereof.

Figures 7, 7A:
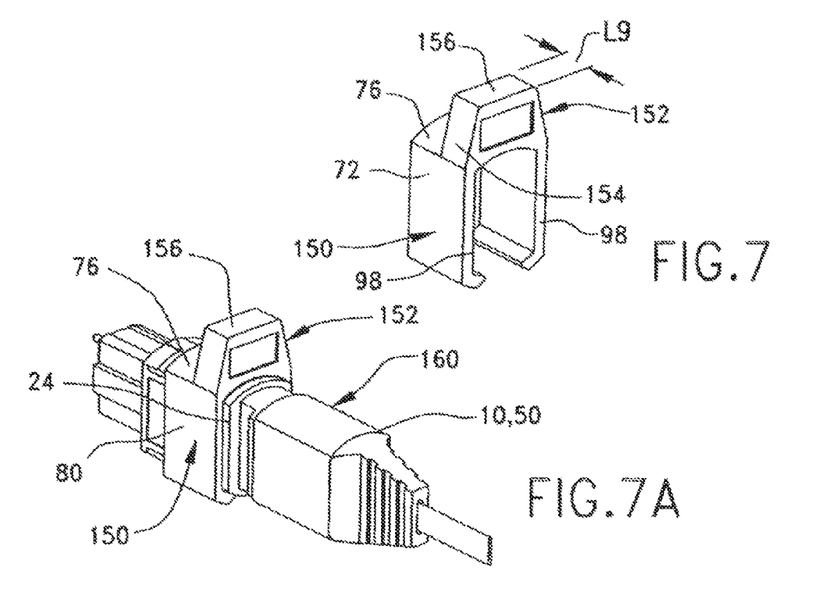
FIG. 7 is a perspective view of a further embodiment of a removal clip or tool.
FIG. 7A is a perspective view, partially broken away, of an assembly of a removal clip as in FIG. 7 and an MPO connector.
Figures 8, 8A:
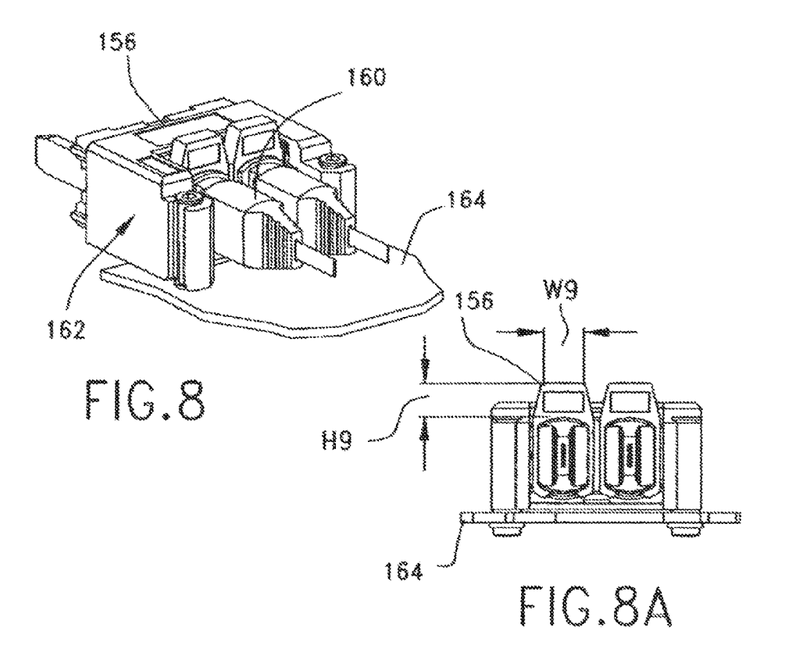
FIG. 8 is a perspective view, partially broken away, of an assembly of removal clips generally according to FIG. 7.
FIG. 8A is a side elevation view of an assembly of removal clips, MPO connectors, MPO adapters and a circuit board as in FIG. 8.

FIG. 7 illustrates a third embodiment of a connector removal clip or tool generally shown as 150 with force transmitting section generally shown as 152 that is a projection extending from the web 76 in a direction considered generally axial to the latch arms 80, 88 of engagement portion 72, while being generally perpendicular to the connector when in use. Force transmitting section 152 is comprised of a projection portion 154 and terminal handle portion 156. Section 152 has length (L9) of about 3 mm, a width (W9) of about 6 mm, and a height (H9) of about 6 mm (FIG. 8A).

FIG. 7A shows an embodiment of a third clip-connector assembly generally shown as 160 that is comprised of the connector removal clip or tool 150 releasably attached to connector 10 or connector 50. Digital removal force can thus be more easily applied at terminal handle portion 156 and away from the congestion surrounding body sections of connectors. FIGS. 8 and 8A show third clip-connector assemblies 160 mounted to adapters 162 that are attached to panel 164. It is easily seen that terminal handles 156 are accessible to an operator for the application of digital removal force. Together, the force transmitting portion and the handle portion 156 have a length less than the spacing between connectors or arrays of connectors. As with the other embodiments, the digital removal force is transmitted from the terminal handle portion to the connector through the interface between engagement portion outwardly facing edge 98 and the shoulder 24 of the connector.

Figure 9:
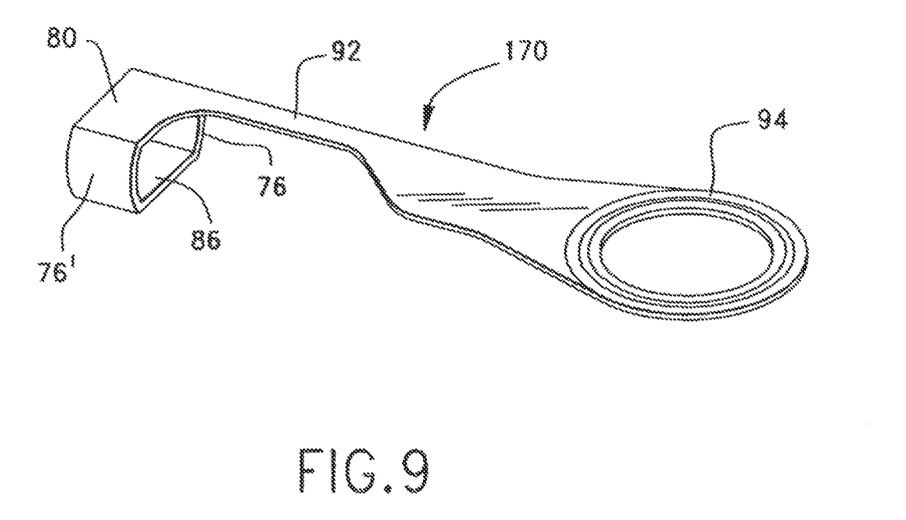
FIG. 9 is a perspective view of a further embodiment of a removal clip or tool.

Just as alternate force transmitting structures may be used, alternate structures of the engagement portion may also be used. For example, the U-shaped structure shown in the Figures including web 76 and resilient arms 80 and 86 could be modified such that one angled end portion 82a would extend across gap 89 and engage the opposite arm and snap closed to completely surround or encircle the connector. In the alternative, such structure could be molded as a fully closed structure shown as part of an alternate embodiment referred to generally as 170 in FIG. 9. In other words, the engagement portion would still include arms 80 and 86 as well as web 76. However, the angled end portions 82 and 88 would be replaced by a second web 76' that extends from and between arms 80 and 86. The remainder of tool 170 is shown as being generally identical the tool of FIG. 4. The tool of FIG. 9 would need to be sufficiently flexible so that the engagement portion could stretch around the connector when the tool is being secured to the connector. Still other alternative structures could be have two pieces that snap, are screwed or otherwise joined together in order to fully encircle the connector. Still another structure could have pins or arms that engage a hole or holes in the connector. In any event, the engagement structure should engage a shoulder or another forwardly facing surface or surfaces on the connector (such as shoulder 24 or the opposing holes 26 in FIG. 1A). It is desirable to maximize the amount of removal force that is applied in a direction along the mating axis and minimize the force perpendicular to the axis. As a result, symmetrically engagement of the tool on the connector should prevent or minimize skewing of the connector as it is unmated. In summary, the engagement portion may take various forms so long as it engages the connector in a sufficiently secure manner so that the removal force applied by a user to the force transmitting structure is transferred to the connector to effectuate removal of the connector.

If desired, the removal clips or tools can perform the function of distinguishing different categories of fiber optic connectors. For example, it may be useful to provide readily discernable identifications for certain specific cable assemblies. This can be done by providing these clips in different colors and then by applying those clips to different connectors in order to identify one or more connectors as having a particular property or intended purpose according to a selected color designation. It is generally not economically acceptable to maintain inventories of differently colored connectors, which might be designated with different functions depending on the needs of numerous possible different installations. The clips or tools that are disclosed herein are much less costly than fiber optic connectors, and can provide useful "identification indicia" in order to distinguish connectors which typically will be of the same color and overall similar shape and size. Thus, color coding by use of the clips or tools is much less complicated and costly when compared with color coding the connectors themselves, in order to color code assemblies of the connectors. This approach of providing color coded tools or clips rather than color coded connectors allows the end user to determine color coding patterns or needs when making an installation and with minimal pre-determination of exactly what color coding needs might be encountered. In short, color coding the clips or tools allows maximum flexibility at minimal cost to the manufacturer as well as the installer of fiber optic systems. Other identification approaches besides color could be used so long as a plurality of unique identification patterns are provided, for example by having differently appearing handles, by shape, color, thickness, width, length, texture and so forth.

The removal clips or tools can incorporate radio frequency identification devices, known as RFID. These RFID units typically incorporate an antenna or a coil, a transceiver having decoder capabilities, and a transponder (RF tag). The RFID option embeds an RFID chip into the clip or tool for providing more sophisticated tracking of information such as identification and cataloging. In the past, RFID chips have been embedded in fiber optic connectors. Following this option of embedding the RFID chips in the tools or clips permits the incorporation of RFID capabilities to, in effect, a selected fiber optic connector on an as-needed basis and without having to incur the cost and complication of embedding an RFID chip into connectors and then choosing an RFID capable connector when assembling an array of connectors. This approach allows for a later determination of exactly which connector or connectors in an array are to be given RFID capability.

The intent of the Present application is not to remove the metal beam supporting the actuator, but to further enhance pressure force on the actuator by combining a metal beam supporting the actuator with the configuration of the Present application described above.

What is claimed is:

1. A fiber optic connector removal clip for engaging a fiber optic connector, the fiber optic connector having a body section with a shoulder surface, the body section being generally rectangular and having four side surfaces, the clip comprising:

an engagement portion, a force transmitting portion and a handle portion;

the engagement portion being configured to engage the body section of the fiber optic connector, the engagement portion having a web, a pair of arms extending from the web to define a body receiving four-sided receptacle, each arm including a generally inwardly directed end portion, the pair of arms being a first distance apart, the end portions of the pair of arms being a second distance apart, the second distance being less than the first distance, and upon positioning the body section of the fiber optic connector within the body receiving receptacle, the web engages a first side surface of the body section, a first arm engages a second side surface of the body section, a second arm engages a third side surface of the body section, and the end portions of the pair of arms cooperatively engage a fourth side surface of the body section, and the engagement portion further having an engagement surface to engage the shoulder surface of the fiber optic connector; and the force transmitting portion being positioned between the engagement portion and the handle portion for transmitting digital connector removal force applied by a user to the handle portion and from the engagement surface to the shoulder surface of the fiber optic connector to facilitate remove of the fiber optic connector.

2. The fiber optic connector removal clip according to claim 1, wherein the body section of the fiber optic connector is a standard body section, and the fiber optic connectors are selected from the group consisting of MPO connectors, SC connectors and MU connectors, each having a standard body section, and the connector is within a densely packed array of the connectors.

3. The fiber optic connector removal clip according to claim 1, wherein the end portions of the pair of arms have an access gap therebetween, at least one of the arms being deflectable to move to an open position upon engagement by the fiber optic body section to accommodate passage of the fiber optic connector body section into the body receiving receptacle, after which the at least one of the arms moves to a closed position at which the engagement portion engages the fiber optic connector body section, the arms at least partially surrounding the body section of the fiber optic connector and engaging the body section with snap attachment fit.

4. The fiber optic connector removal clip according to claim 3, wherein the pair of arms are deflectable to further open the access gap and to resiliently move the access gap back toward its position corresponding to the closed position of the engagement portion.

5. The fiber optic connector removal clip according to claim 1, wherein the removal clip is a unitary structure comprised of molded polymeric material.

6. The fiber optic connector removal clip according to claim 1, wherein each of the arms has an edge facing the handle portion that defines at least a portion of the engagement surface and is generally perpendicular to the access gap.

7. The fiber optic connector removal clip according to claim 6, wherein the latch arms are generally parallel to each other and have a bight portion extending therebetween.

8. The fiber optic connector removal clip according to claim 7, wherein the bight portion is a curved member joining the latch arms together at a location generally opposite to the access gap.

9. The fiber optic connector removal clip according to claim 6, wherein the force transmitting portion and the handle portion together have a combined length greater than the body portion of the connector and extend in a direction generally perpendicular to the edges of the arms.

10. The fiber optic connector removal clip according to claim 9, wherein the handle portion is coplanar with one of the arms and includes an aperture remote from the engagement portion to receive an operator's digit therein.

11. The fiber optic connector removal clip according to claim 9, wherein the handle portion is generally perpendicular to at least one of the arms and is a generally linear extension of the force transmitting portion.

12. The fiber optic connector removal clip according to claim 1, wherein the engagement portion is generally U-shaped.

13. The fiber optic connector removal clip according to claim 1, wherein the end portion of each arm extends at an angle between about 100 degrees and about 130 degrees from its arm.

14. The fiber optic connector removal clip according to claim 1, comprising a plurality of the clips, and different ones of the clips incorporate respective different identification indicia.

* * * * *